United States Patent
Gough et al.

(10) Patent No.: US 10,107,222 B2
(45) Date of Patent: Oct. 23, 2018

(54) PARTICULATE FILTER TEST SYSTEM AND METHOD

(71) Applicant: Carrier Corporation, Farmington, CT (US)

(72) Inventors: Jason A. Gough, Marcellus, NY (US); Garrison S. Moseley, Liverpool, NY (US); Michael Stockbridge, Canastota, NY (US); John T. Steele, Marcellus, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 15/116,909

(22) PCT Filed: Jan. 16, 2015

(86) PCT No.: PCT/US2015/011680
§ 371 (c)(1),
(2) Date: Aug. 5, 2016

(87) PCT Pub. No.: WO2015/119757
PCT Pub. Date: Aug. 13, 2015

(65) Prior Publication Data
US 2017/0167423 A1    Jun. 15, 2017

Related U.S. Application Data

(60) Provisional application No. 61/936,664, filed on Feb. 6, 2014.

(51) Int. Cl.
*F02D 41/22*    (2006.01)
*F02M 35/00*    (2006.01)
(Continued)

(52) U.S. Cl.
CPC ............ *F02D 41/22* (2013.01); *F01N 3/023* (2013.01); *F01N 11/00* (2013.01);
(Continued)

(58) Field of Classification Search
CPC .. F01N 11/00; F01N 2240/36; F01N 2250/04; F01N 3/023; F02D 2009/0203;
(Continued)

(56) References Cited

U.S. PATENT DOCUMENTS 5,123,252 A    6/1992    Hanson
5,140,825 A    8/1992    Hanson et al.
(Continued)

FOREIGN PATENT DOCUMENTS

DE    102006059406 A1    6/2007
DE    102013204797 A1    9/2014
(Continued)

OTHER PUBLICATIONS

JP 2001207917 A—English Translation.*
(Continued)

*Primary Examiner* — Joseph Dallo
*Assistant Examiner* — Scott A Reinbold
(74) *Attorney, Agent, or Firm* — Locke Lord LLP; Daniel J. Fiorello; Scott D. Wofsy

(57)    ABSTRACT

A system for testing a particulate filter system includes a filter controller connected to the particulate filter system and a vehicular computer configured to determine at least one engine condition. The filter controller is configured to control a condition of a component of the particulate filter system and the vehicular computer is operatively connected to the filter controller to communicate therewith. The vehicular computer compares the condition of the component of the particulate filter system with the engine condition
(Continued)

to determine whether the component of the particulate filter system is functioning properly.

17 Claims, 2 Drawing Sheets

(51) Int. Cl.
  *F01N 3/023* (2006.01)
  *F02D 41/14* (2006.01)
  *F01N 11/00* (2006.01)
  *F02D 41/02* (2006.01)

(52) U.S. Cl.
  CPC ....... *F02D 41/1497* (2013.01); *F02D 41/221* (2013.01); *F02M 35/00* (2013.01); *F01N 2240/36* (2013.01); *F01N 2550/04* (2013.01); *F02D 41/029* (2013.01); *F02D 2041/228* (2013.01); *F02D 2200/101* (2013.01); *Y02T 10/40* (2013.01); *Y02T 10/47* (2013.01)

(58) Field of Classification Search
  CPC ....... F02D 2009/0205; F02D 2011/102; F02D 2011/103; F02D 2041/228; F02D 2200/0404; F02D 2200/101; F02D 31/002; F02D 41/029; F02D 41/1497; F02D 41/22; F02D 41/221; F02M 35/00; F02M 3/023; Y02T 10/40; Y02T 10/47; F15B 20/008
  USPC ........................................................ 123/375
  See application file for complete search history.

(56) References Cited

U.S. PATENT DOCUMENTS

| | | |
|---|---|---|
| 5,172,561 A | 12/1992 | Hanson et al. |
| 5,201,185 A | 4/1993 | Hanson et al. |
| 5,438,841 A | 8/1995 | Cahill-O'Brien et al. |
| 5,515,693 A | 5/1996 | Cahill-O'Brien et al. |
| 6,067,805 A | 5/2000 | Porter et al. |
| 6,205,798 B1 | 3/2001 | Porter et al. |
| 6,233,952 B1 | 5/2001 | Porter et al. |
| 6,996,997 B2 | 2/2006 | Wiff et al. |
| 8,286,437 B2 | 10/2012 | Sanders et al. |
| 8,390,464 B1 | 3/2013 | Slifkin et al. |
| 2003/0225507 A1* | 12/2003 | Tamura ............... F01N 3/20 701/114 |
| 2008/0209887 A1 | 9/2008 | Hanari et al. |
| 2008/0228514 A1 | 9/2008 | Robinson et al. |
| 2013/0138251 A1 | 5/2013 | Thogersen et al. |
| 2013/0145460 A1 | 6/2013 | Dudley et al. |

FOREIGN PATENT DOCUMENTS

| | | | |
|---|---|---|---|
| EP | 1462635 A1 | 9/2004 | |
| EP | 2369146 A1 | 9/2011 | |
| JP | 2001207917 A * | 8/2001 | ............... F02D 9/04 |
| JP | 2001207917 A | 8/2001 | |
| JP | 2008138621 A | 6/2008 | |
| WO | WO-2010068146 A1 | 6/2010 | |

OTHER PUBLICATIONS

PCT International Search Report dated May 22, 2015, issued on corresponding PCT International Patent Application No. PCT/US2015/011680.

* cited by examiner

PARTICULATE FILTER TEST SYSTEM AND METHOD

RELATED APPLICATIONS

This application is a U.S. National stage application of PCT/US2015/011680 filed Jan. 16, 2015, which claims the benefit of and priority to U.S. Provisional Patent Application No. 61/936,664 filed Feb. 6, 2014, the contents of which are incorporated herein by reference in their entirety.

BACKGROUND

1. Field

The present disclosure relates to systems for transportation, and more particularly to test systems for vehicles and components thereof.

2. Description of Related Art

A diesel particulate filter (DPF) is a device designed to remove diesel particulate matter or soot from the exhaust gas of a diesel engine. Wall-flow diesel particulate filters usually remove 85% or more of the soot and, under certain conditions, can attain soot removal efficiencies approaching 100%. Some filters are single-use, i.e., they are intended for disposal and replacement once full of accumulated ash. Others are designed to burn off the accumulated particulate either passively through the use of a catalyst or by active means such as a fuel burner which heats the filter to soot combustion temperatures. This is accomplished by elevating exhaust temperature, producing high amounts of NOx to oxidize the accumulated ash, and/or through other methods. This is known as "filter regeneration."

Such conventional methods and systems have generally been considered satisfactory for their intended purpose. However, there is still a need in the art for improved DPF systems. The present disclosure provides a solution for this need.

SUMMARY

In at least one aspect of this disclosure, a system for testing a particulate filter system includes a filter controller connected to the particulate filter system and a vehicular computer configured to determine at least one engine condition. The filter controller is configured to control a condition of a component of the particulate filter system and the vehicular computer is operatively connected to the filter controller to communicate therewith. The vehicular computer compares the condition of the component of the particulate filter system with the engine condition to determine whether the component of the particulate filter system is functioning properly.

The component of the particulate filter system can be an air control valve. In some embodiments, the filter controller can be configured to open and close the air control valve between about full open and about 90% valve closure. The engine condition can be engine speed.

The vehicular computer can output an alarm signal if the component is determined to not be functioning properly. The vehicular computer can output a pass signal if the component is determined to be functioning properly.

In some embodiments, the vehicular computer determines that the component is functioning properly if the engine speed experiences a sufficient drop at about 85% valve closure to about 90% valve closure. The sufficient drop can be any suitable engine speed drop, e.g., about 20 RPM.

In some embodiments, if the vehicular computer determines that the air control valve is functioning properly, the vehicular computer can be configured to cause the filter controller to test the particulate filter system to determine if a filter regeneration feature is functioning properly.

In at least one aspect of this disclosure, a method for determining whether a component of a particulate filter system is functioning properly includes controlling an air control valve between an open condition to a partially closed condition, sensing an engine condition, and comparing the sensed engine condition for reaction to closing or opening the air control valve.

The partially closed condition can be between about 85% valve closure and about 90% valve closure. The method can further include outputting an alarm signal if the engine speed does not experience a sufficient drop at the partially closed condition. The method can further include testing a regeneration cycle of the particulate filter system if the engine speed does experience a sufficient drop at the partially closed condition.

In some embodiments, the testing of the regeneration cycle can include initiating the regeneration cycle and detecting a state change of a particulate filter within a test time. The test time can be any suitable time, e.g., about 15 minutes.

In at least one aspect of this disclosure, a non-transitory medium includes a computer executable list of instructions for testing a diesel particulate filter for a vehicle, the list of instructions including receiving a test activation command, receiving a first signal at a vehicular computer, the first signal corresponding to a first engine speed of the vehicle, closing an air control valve to a partially closed condition, receiving a second signal at the vehicular computer, the second signal corresponding to a second engine speed of the vehicle, and comparing the first engine speed to the second engine speed to determine if there is a sufficient engine speed drop. If the sufficient engine speed drop is present, a pass signal can be generated, otherwise a fail signal can be generated.

The list of instructions can further include instructions for testing a regeneration cycle of the particulate filter system if the engine speed does experience the sufficient drop at the partially closed condition.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
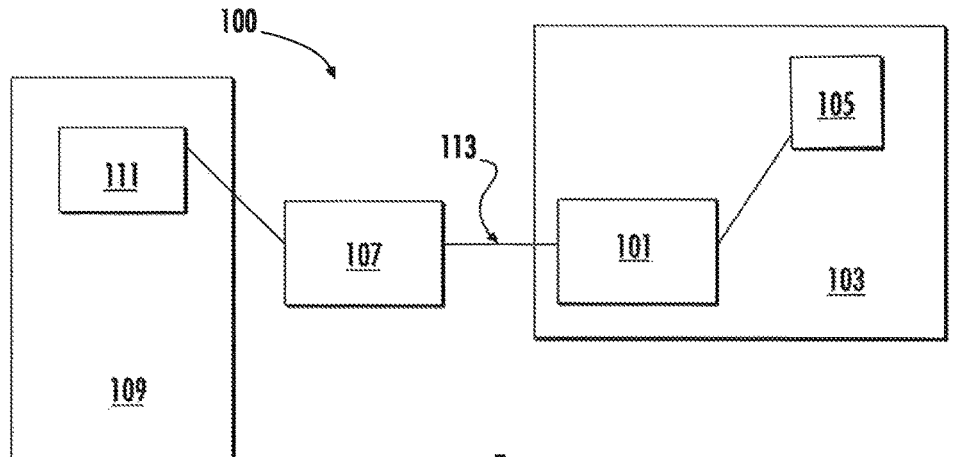
FIG. 1 is a systematic view of an embodiment of a system constructed in accordance with the present disclosure, showing a filter controller connected to a vehicular computer.

Reference will now be made to the drawings wherein like reference numerals identify similar structural features or aspects of the subject disclosure. For purposes of explanation and illustration, and not limitation, a partial view of an embodiment of a particulate filter test system in accordance with the disclosure is shown in FIG. 1 and is designated generally by reference character 100. Embodiments of a method in accordance with this disclosure, or aspects thereof, are provided in FIGS. 2 and 3, as will be described. The systems and methods described herein can be used to test a particulate filter system and/or components thereof for proper functioning.

Referring to FIG. 1, a system 100 for testing a particulate filter system 103 is shown having a filter controller 101 connected to and/or forming part of the particulate filter system 103. The particulate filter system 103 can be a DPF for diesel vehicles or any other suitable particulate filter system.

The filter controller 101 can be any suitable circuit, computer, or other device capable of testing systems of a particulate filter system. Also, filter controller 101 can be programmed with any suitable software, code, or the like configured to perform tasks required to operate one or more components of the particulate filter system 103.

The filter controller 101 is configured to control a condition of one or more components of the particulate filter system 103. The component of the particulate filter system 103 that is tested and controlled by the filter controller 101 can be an air control valve 105 as shown in the embodiment of FIG. 1, and/or any other suitable component.

System 100 also includes a vehicular computer 107 and/or one or more other suitable systems that can be configured to determine at least one condition of a vehicle 109 (e.g. an engine condition) by communicating with a sensor 111. For example, vehicular computer 107 can be a computer that is already installed on or integrated with a vehicle to control/monitor other vehicular components and/or functions (e.g. engine health, fuel supply, throttle, power differential, ABS, and the like). The vehicular condition can be engine speed (RPM), for example.

In some embodiments, the vehicular computer 107 can be designed and/or retrofitted (e.g., with a suitable software or firmware update) to be configured to test the functions of a particulate filter system as described herein. In other embodiments, the vehicular computer 107 can include or be operatively connected to a separate pretrip test system that is retrofit (e.g., with a suitable software or firmware update) to be configured to test the functions of a particulate filter system as disclosed herein.

The vehicular computer 107 can be operatively connected to the filter controller 101 to communicate therewith via connection 113. In other embodiments, the vehicular computer 107 can be directly connected to one or more components of the particulate filter system 103 to directly control a condition thereof. Connection 113 can be any suitable connection, such as, but not limited to, hard wiring and/or an electromagnetic connection (e.g., wireless LAN, Bluetooth, RF, microwave, etc.). For example, the filter controller 101 and the vehicle computer 107 (e.g., including an updated pretrip test controller) can be connected via a suitable network.

In some embodiments, the vehicular computer 107 and/or other suitable pre-trip test system can be configured to instruct the filter controller 101 to open and close the air control valve between about full open and about 90% valve closure. Any other suitable closure percentage is contemplated herein (e.g., 91%, 95%, 99.5%).

The vehicular computer 107 can acquire information regarding a vehicular condition (e.g., RPM) from a suitable component of a vehicle (e.g., sensor 111) and compare this information to the input condition of the component of the particulate filter system 103 that is being tested (e.g., air control valve 105). For example, the vehicular computer 107 may instruct the filter controller 101 to signal the air control valve 105 to close to a test valve closure (e.g., about 85% valve closure) and then determine if an expected drop in engine speed (RPM) is detected by the vehicular computer 107 and/or if the detected drop is a sufficient drop to indicate proper function for that valve closure percentage.

In some embodiments, the vehicular computer 107 can be configured to instruct the filter controller 101 to iterate further closure of the valve 105 by any suitable increment up to a predefined maximum closure (e.g. about 90%, about 95%, about 99%) if a sufficient engine speed drop has not yet been detected. In some embodiments, the vehicular computer 107 can determine that the component is functioning properly if engine speed experiences a sufficient drop at about 85% valve closure to about 90% valve closure. A sufficient drop can be about 20 RPM or any other suitable speed difference for a given engine. While the embodiments described herein relate to valve closure testing, it is envisioned that the reverse procedure (e.g., iterating toward an open condition) can be cross-checked against an engine condition in a similar manner (e.g., a 20 RPM rise from 85% valve closure to the valve open condition).

The vehicular computer 107 can be configured to output an alarm signal if the component (e.g. air control valve 105) is determined to not be functioning properly, e.g., if the engine RPM fail to sufficiently react to the change in commanded valve state. Conversely, the vehicular computer 107 can output a pass signal if the component (e.g. air control valve 105) is determined to be functioning properly, e.g., if the engine RPM react as expected based on the commanded valve state. Either signal can cause an indicator to activate indicating pass or fail to the user accordingly.

In some embodiments, if the vehicular computer 107 determines that the component (e.g., air control valve 105) is functioning properly, the vehicular computer 107 can be configured to instruct the filter controller 101 to test the particulate filter system 103 to determine if a filter regeneration feature is functioning properly. The filter regeneration feature allows a filter of the particulate filter system 103 to be cleaned and reused. For example, the filter controller 101 can be configured to activate filter regeneration and can communicate with the vehicular computer 107 so that the vehicular computer 107 can determine if regeneration has occurred or is occurring by using any suitable diagnostics (e.g., determining a state change of a filter). In some embodiments, this can be done by commanding a regeneration and sensing for an expected temperature increase at the filter.

Figure 2:
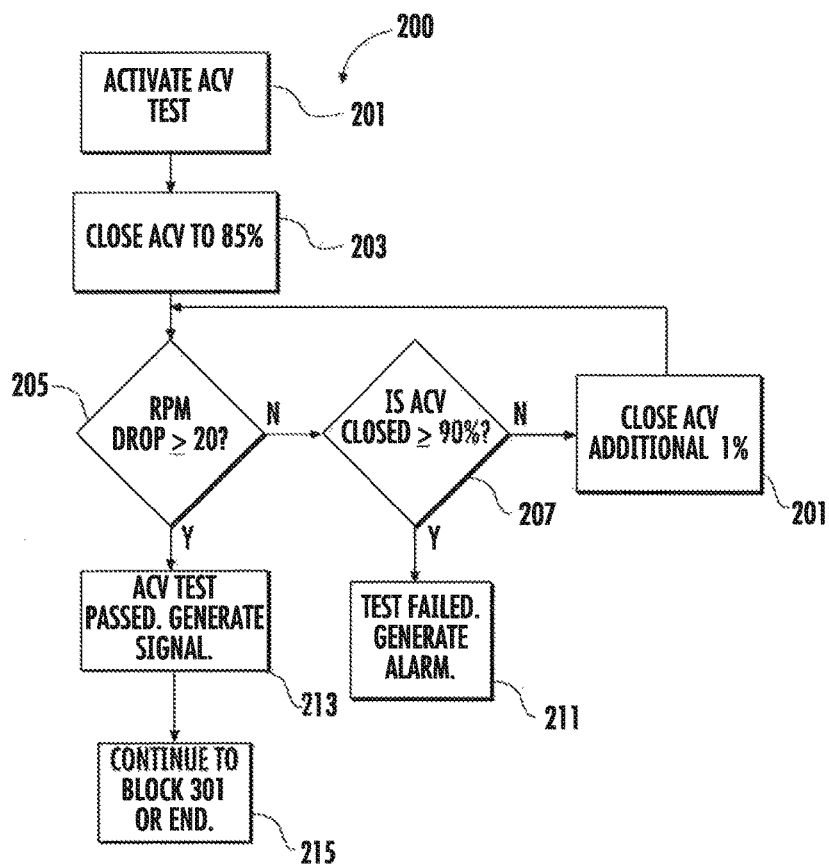
FIG. 2 is a diagram view of a method in accordance with the present disclosure.

In at least one aspect of this disclosure, referring to FIG. 2, an embodiment of a method (e.g. method 200) for determining proper function of a component of a particulate filter system 103 is shown. At block 201, the test is activated either manually by a user, automatically by the vehicular computer 107, or via any other suitable means. At block 203, the vehicular computer 107 instructs the filter controller 101 to cause the air control valve 105 to close from an open condition to a partially closed condition as disclosed herein. The embodiment 200 of FIG. 2 shows the valve being closed to about 85% valve closure.

At block 205, the vehicle computer 107 is used to sense an engine condition (e.g. engine speed), and the vehicular computer 107 compares the sensed engine condition for a reaction (e.g., a suitable RPM drop) to closing the air control valve 105. As shown, if an RPM drop of the engine is less than 20, the method 200 moves to block 207.

At block 207, the vehicular computer 107 determines if the air control valve 105 has reached its maximum instructed closure (shown as about 90% in FIG. 2). In at least some embodiments, if the maximum instructed valve closure has been reached, then the method 200 transitions to block 211 where the test is failed and the vehicular computer 107 can generate an alarm signal as described above. If the maximum instructed valve closure has not yet been reached, then the vehicular computer 107 can instruct the filter controller 101 to iterate further closure of the air control valve 105 (e.g., by 1% increments as shown in FIG. 2) and repeat block 205. While the increments are shown as 1% in FIG. 2, the increments can be any suitable iteration (e.g. 0.5%, 2%, or the like).

As shown, if an RPM drop of the engine is greater than or equal to 20, the method 200 moves to block 213 where the test of the air control valve 105 is passed. A pass signal as described herein may optionally be generated at this point if desired to signify that the air control valve 105 is functioning properly.

Figure 3:
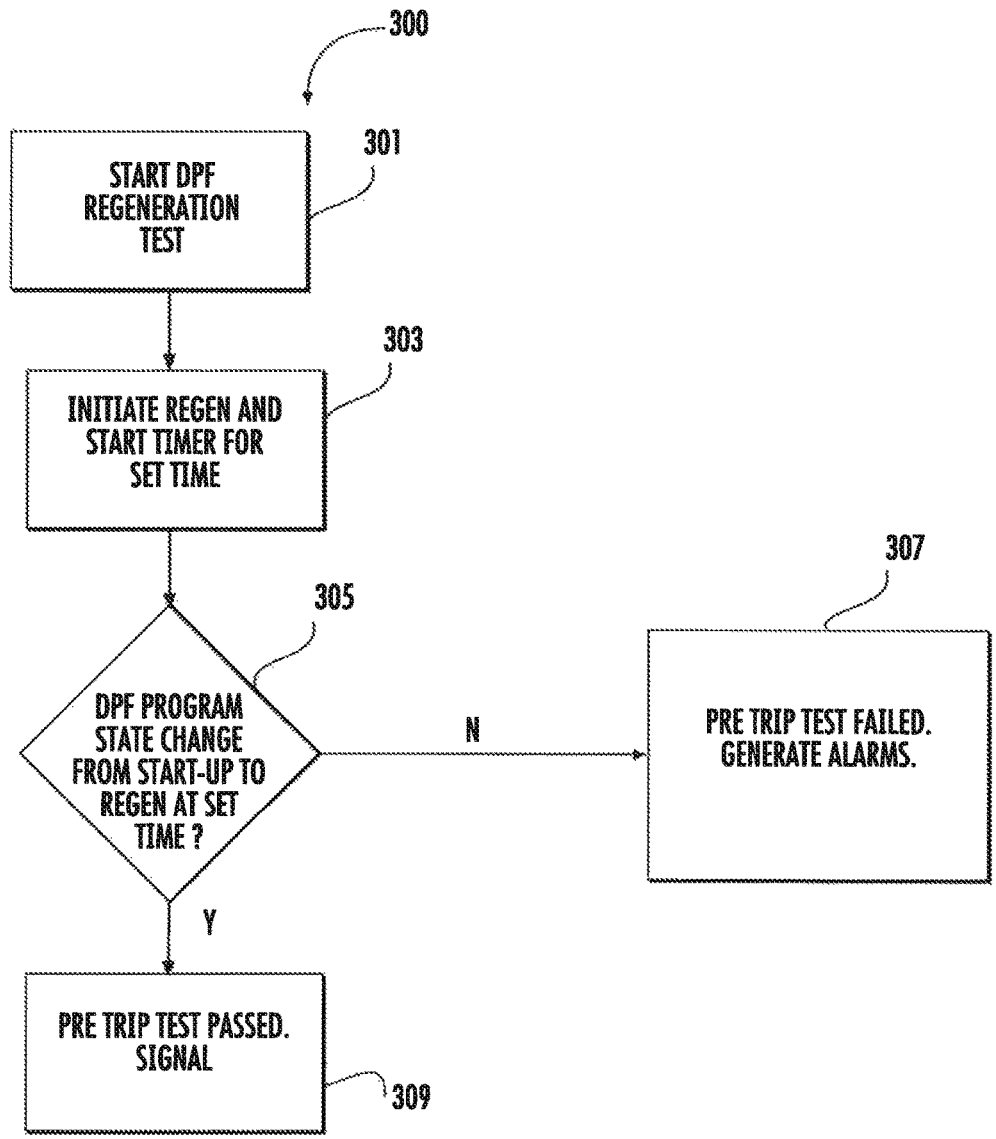
FIG. 3 is a diagram view of a method in accordance with the present disclosure.

Method 200 may then end at block 215 or continue to a filter regeneration feature test (e.g., block 301 of method 300 shown in FIG. 3). If the method 200 continues to block 301 of method 300, a pass signal may optionally not be sent until block 309 of method 300.

Referring to the embodiment of a method shown in FIG. 3, a method 300 can include testing a regeneration cycle of the particulate filter system 103. At block 301, the test is initiated by any suitable means (e.g. manually or automatically by vehicular computer 107 at block 215 of FIG. 2). In some embodiments, the testing of the regeneration cycle can include initiating the regeneration cycle at block 303 and/or starting a timer. At block 305, a state change of a particulate filter (e.g., filter temperature change expected for a properly functioning system) can be detected within a test time. In some embodiments, the test time can be about 15 minutes.

If a suitable state change is not detected, the method 300 moves to block 307 where the test is failed and an alarm signal as disclosed herein can be generated. If the state change is detected the method can move to block 309 where the test is passed and a pass signal can be generated by the vehicular computer 107.

In at least one aspect of this disclosure, a non-transitory medium includes a computer executable list of instructions for testing a diesel particulate filter for a vehicle, the list of instructions including receiving a test activation command, receiving a first signal at a vehicular computer, the first signal corresponding to a first engine speed of the vehicle, closing an air control valve to a partially closed condition, receiving a second signal at the vehicular computer, the second signal corresponding to a second engine speed of the vehicle, and comparing the first engine speed to the second engine speed to determine if there is a sufficient engine speed drop. If the sufficient engine speeds drop is present, a pass signal can be generated, otherwise a fail signal can be generated. The list of instructions can further include testing a regeneration cycle of the particulate filter system if the engine speed does experience the sufficient drop at the partially closed condition.

The methods and systems of the present disclosure, as described above and shown in the drawings, provide for particulate filter system diagnostics with the ability to test a DPF or similar system against a vehicles engine or other suitable component. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system for testing a particulate filter system, comprising:
   a filter controller connected to the particulate filter system, the filter controller configured to control a condition of an air control valve of the particulate filter system; and
   a vehicular computer configured to determine an engine speed, the vehicular computer operatively connected to the filter controller to communicate therewith, wherein the computer is configured to instruct the filter controller to cause the air control valve to close from an open condition to a partially closed condition up to a maximum instructed valve closure;
   wherein the vehicular computer is configured to compare the condition of the air control valve of the particulate filter system with the engine speed to determine whether the air control valve of the particulate filter system is functioning properly based on a sufficient engine speed drop in response to closure of the air control valve,
   wherein the vehicular computer is configured to determine if an instructed condition of the air control valve has reached a maximum instructed closure,
   wherein if the maximum instructed valve closure has not yet been reached before the sufficient engine speed drop, then the vehicular computer instructs the filler controller to iterate further closure of the air control valve, wherein if the maximum instructed valve closure has been reached before the sufficient engine speed drop, then the vehicular computer determines the air control valve is not functioning properly.

2. The system of claim 1, wherein the vehicular computer is configured to instruct the filter controller to open and close the air control valve between about full open and about 90% valve closure.

3. The system of claim 1, wherein the vehicular computer outputs an alarm signal if the air control valve is determined to not be functioning properly.

4. The system of claim 1, wherein the vehicular computer outputs a pass signal if the air control valve is determined to be functioning properly.

5. The system of claim 2, wherein the vehicular computer determines that the air control valve is functioning properly if the engine speed experiences a sufficient drop at about 85% valve closure to about 90% valve closure.

6. The system of claim 5, wherein the sufficient drop is about 20 RPM.

7. The system of claim 5, wherein if the vehicular computer determines that the air control valve is functioning properly, the vehicular computer is configured to instruct the filter controller to test the particulate filter system to determine if a filter regeneration feature is functioning properly.

8. A method for determining whether a component of a particulate filter system is functioning properly, comprising:
   controlling an air control valve between an open condition to a partially closed condition up to a maximum instructed valve closure;
   sensing an engine speed to determine a sufficient engine speed drop; and
   comparing the sensed engine speed for reaction to closing or opening the air control valve;

determining if an instructed condition of the air control valve has reached the maximum instructed closure, wherein if the maximum instructed valve closure has not yet been reached before the sufficient engine speed drop, then iterating further closure of the air control valve, wherein if the maximum instructed valve closure has been reached before the sufficient engine speed drop, then determining that the air control valve is not functioning properly.

9. The method of claim 8, wherein the partially closed condition is between about 85% valve closure and about 90% valve closure.

10. The method of claim 8, further comprising outputting an alarm signal if the air control valve is determined to not be functioning properly.

11. The method of claim 8, further comprising testing a regeneration cycle of the particulate filter system if the engine speed does experience a sufficient drop at the partially closed condition.

12. The method of claim 11, wherein the testing of the regeneration cycle comprises:

initiating the regeneration cycle; and detecting a state change of a particulate filter within a test time.

13. The method of claim 12, wherein the test time is about 15 minutes.

14. A non-transitory medium including computer executable list of instructions for testing a diesel particulate filter for a vehicle, the list of instructions comprising:

receiving a test activation command;

receiving a first signal from a vehicular computer, the first signal corresponding to a first engine speed of the vehicle;

instructing closure of an air control valve to a partially closed condition;

receiving a second signal from the vehicular computer, the second signal corresponding to a second engine speed of the vehicle;

comparing the first engine speed to the second engine speed to determine if there is a sufficient engine speed drop;

determining if an instructed condition of the air control valve has reached the maximum instructed closure, wherein if the maximum instructed valve closure has not yet been reached before the sufficient engine speed drop, then iterating further closure of the air control valve, wherein if the maximum instructed valve closure has been reached before the sufficient engine speed drop, then determining that the air control valve is not functioning properly.

15. The non-transitory computer readable medium of claim 14, wherein if the sufficient engine speeds drop is present, a pass signal is generated, otherwise a fail signal is generated.

16. The non-transitory computer readable medium of claim 14, wherein the sufficient drop is about 20 RPM.

17. The non-transitory computer readable medium of claim 14, wherein the list of instructions further include instructions for testing a regeneration cycle of the particulate filter system if the engine speed does experience the sufficient drop at the partially closed condition.

* * * * *